United States Patent
Dong

(10) Patent No.: US 9,348,743 B2
(45) Date of Patent: May 24, 2016

(54) INTER-SET WEAR-LEVELING FOR CACHES WITH LIMITED WRITE ENDURANCE

(71) Applicant: QUALCOMM Incorporated, San Diego, CA (US)

(72) Inventor: Xiangyu Dong, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 195 days.

(21) Appl. No.: 13/772,400

(22) Filed: Feb. 21, 2013

(65) Prior Publication Data

US 2014/0237160 A1 Aug. 21, 2014

(51) Int. Cl.
*G06F 12/08* (2006.01)
*G06F 12/02* (2006.01)

(52) U.S. Cl.
CPC ........ *G06F 12/0238* (2013.01); *G06F 12/0802* (2013.01); *G06F 12/0864* (2013.01); *G06F 12/0891* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 3,700,865 | A * | 10/1972 | Ley | ..................................... 708/3 |
| 3,772,595 | A * | 11/1973 | De Wolf et al. | ............... 714/736 |
| 7,035,967 | B2 | 4/2006 | Chang et al. | |
| 7,046,174 | B1 * | 5/2006 | Lui et al. | ....................... 341/101 |
| 7,568,068 | B2 | 7/2009 | Sanvido et al. | |
| 7,797,481 | B2 | 9/2010 | Lee et al. | |
| 8,112,574 | B2 | 2/2012 | Lee et al. | |
| 8,275,945 | B2 | 9/2012 | Tzeng | |
| 2005/0240731 | A1 | 10/2005 | Steely | |
| 2008/0137463 | A1 * | 6/2008 | Ishikawa | ........................ 365/222 |
| 2008/0228991 | A1 * | 9/2008 | Ferroussat et al. | ............. 711/100 |
| 2009/0138654 | A1 | 5/2009 | Sutardja | |
| 2009/0168525 | A1 * | 7/2009 | Olbrich et al. | ........... 365/185.11 |
| 2009/0198882 | A1 * | 8/2009 | Ji et al. | ........................... 711/109 |
| 2010/0017650 | A1 * | 1/2010 | Chin et al. | ........................ 714/6 |
| 2010/0115175 | A9 | 5/2010 | Zhuang et al. | |
| 2010/0185816 | A1 | 7/2010 | Sauber et al. | |
| 2010/0281202 | A1 * | 11/2010 | Abali et al. | .................... 711/103 |
| 2011/0316816 | A1 * | 12/2011 | Okuma et al. | ................ 345/204 |
| 2012/0131304 | A1 | 5/2012 | Franceschini et al. | |
| 2012/0278543 | A1 | 11/2012 | Yu et al. | |
| 2012/0311228 | A1 | 12/2012 | Hsu et al. | |
| 2013/0219328 | A1 | 8/2013 | Rosen et al. | |
| 2014/0237191 | A1 | 8/2014 | Dong | |

OTHER PUBLICATIONS

Moinuddin K. Qureshi et al, "Enhancing lifetime and security of PCM-based main memory with start-gap wear leveling", MICRO'09, Dec. 12-16, 2009, pp. 14-23.*

(Continued)

*Primary Examiner* — Adam M Queler
*Assistant Examiner* — Dustin Bone
(74) *Attorney, Agent, or Firm* — Seyfarth Shaw LLP

(57) ABSTRACT

A cache controller includes a first register that updates after every memory location swap operation on a number of cache sets in a cache memory and resets every N−1 memory location swap operations. N is a number of the cache sets in the cache memory. The memory controller also has a second register that updates after every N−1 memory location swap operations, and resets every ($N^2$−N) memory location swap operations. The first and second registers track a relationship between logical locations and physical locations of the cache sets.

20 Claims, 8 Drawing Sheets

(56) References Cited

OTHER PUBLICATIONS

Jadidi, Amin et al, "High-Endurance and Performance-Efficient Design of Hybrid Cache Architectures through Adaptive Line Replacement", Low Power Electronics and Design (ISLPED) 2011 International Symposium on, Aug. 1-3, 2011, pp. 79-84.*

Xiangyu, "i2WAP: Improving Non-Volatile Cache Lifetime by Reducing Inter- and Intra-Set Write Variations," Feb. 2013, 12 pages.

International Search Report and Written Opinion—PCT/US2014/015994—ISA/EPO—Jun. 6, 2014.

Jadidi A., et al., "High-Endurance and performance-efficient design of hybrid cache architectures through adaptive line replacement," International Symposium on Low Power Electronics and Design (ISLPED), Aug. 1, 2011, pp. 79-84, XP032038792, DOI: 10.1109/ISLPED.2011.5993611, ISBN: 978-1-61284-658-3, Chapter III. Write Management Policies.

Qureshi M.K., et al., "Enhancing lifetime and security of PCM-based main memory with start-gap wear leveling," Proceedings of the 42nd Annual IEEE/ACM International Symposium on Microarchitecture, Micro-42, Jan. 1, 2009, pp. 14-23, XP055120713, New York, DOI: 10.114511669112.1669117, ISBN: 978-1-60-558798-1.

Zhou P., et al., "A durable and energy efficient main memory using phase change memory technology," ACM SIGARCH Computer Architecture News, Jun. 15, 2009, vol. 37 (3), pp. 14-23, XP055120565, ISSN: 0163-5964, DOI: 10.1145/1555815.1555759, Chapter 3 Improving the endurance of PCM.

Liu, et al., "PCM-Based Durable Write Cache for Fast Disk I/O", Modeling, Analysis & Simulation of Computer and Telecommunication Systems (MASCOTS), 2012 IEEE 20th International Symposium, Aug. 7-9, 2012, pp. 451-458.

\* cited by examiner

INTER-SET WEAR-LEVELING FOR CACHES WITH LIMITED WRITE ENDURANCE

TECHNICAL FIELD

The present disclosure generally relates to memories and caches. More specifically, the present disclosure relates to inter-set wear-leveling for caches with limited write endurance.

BACKGROUND

For high-speed digital electronics that may be used for wireless communications or other application, non-volatile memories are used. Non-volatile memories, such as resistive random access memory (ReRAM) and phase-change random access memory (PCRAM), however, have limited write endurance. Write endurance can be defined as the number of program/cycles that can be applied to a block of memory before the storage media becomes unreliable, and is usually calculated by estimating how often and how thoroughly the memory is used. In other words, write endurance measures the service life of a certain type of storage media.

Wear-leveling is a technique that is used to prolong the write endurance (e.g., service life) of storage media, and is part of cache design. One wear-leveling approach arranges data so that re-writes are evenly distributed across the storage medium. In this way, no single block fails due to a high concentration of write cycles. Other approaches to wear-leveling may include dynamically updating a map every time a write occurs, the map subsequently linking the written block to a new block. Another approach statically keeps the blocks the same without replacing them, but periodically rotates the blocks so they may be used by other data.

Wear-leveling for non-volatile memories (e.g., which may also be used in the main memories for computers) is well known and well explored. Nevertheless, when using wear-leveling for on-chip caches, traditional wear-leveling approaches that are usually employed for non-volatile memories exhibit too much performance overhead. Therefore, the high performance overhead inhibits the effectiveness of year-leveling techniques for caches having limited write endurance.

SUMMARY

According to one aspect of the present disclosure, a cache controller to inter-set wear-level a cache memory is described. The cache controller includes a first register that updates after each memory location swap operation on cache sets of the cache memory, and resets at each N−1 memory location swap operations. N is a number of cache sets in the cache memory. The cache controller further includes a second register that updates after every N−1 memory location swap operations on the cache sets of the cache memory, and resets every ($N^2$−N) memory location swap operations. The first register and the second register may track a relationship between logical locations and physical locations of the cache sets.

According another aspect of the present disclosure, a method for inter-set wear-leveling a cache memory is described. The method includes dynamically rotating cache sets of the cache memory by performing memory location swap operations on the cache sets when a number of memory write operations to the cache memory reaches a threshold value. Each swap operation may include clearing the contents from only the swapped cache sets, while leaving memory contents of other cache sets intact. The method also includes tracking the swapped cache sets to convert a logical cache set number to a physical cache set number.

According to a further aspect of the present disclosure, a cache controller to inter-set wear-level a cache memory is described. The cache controller includes a means for dynamically rotating cache sets of the cache memory by performing memory location swap operations on the cache sets when a number of memory write operations to the cache memory reaches a threshold value. Each swap operation may include clearing the contents from only the swapped cache sets, while leaving memory contents of other cache sets intact. The cache controller further includes a means for tracking the swapped cache sets to convert a logical cache set number to a physical cache set number.

According another aspect of the present disclosure, a method for inter-set wear-leveling a cache memory is described. The method includes the step of dynamically rotating cache sets of the cache memory by performing memory location swap operations on the cache sets when a number of memory write operations to the cache memory reaches a threshold value. Each swap operation may include clearing the contents from only the swapped cache sets, while leaving memory contents of other cache sets intact. The method also includes the step of tracking the swapped cache sets to convert a logical cache set number to a physical cache set number.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
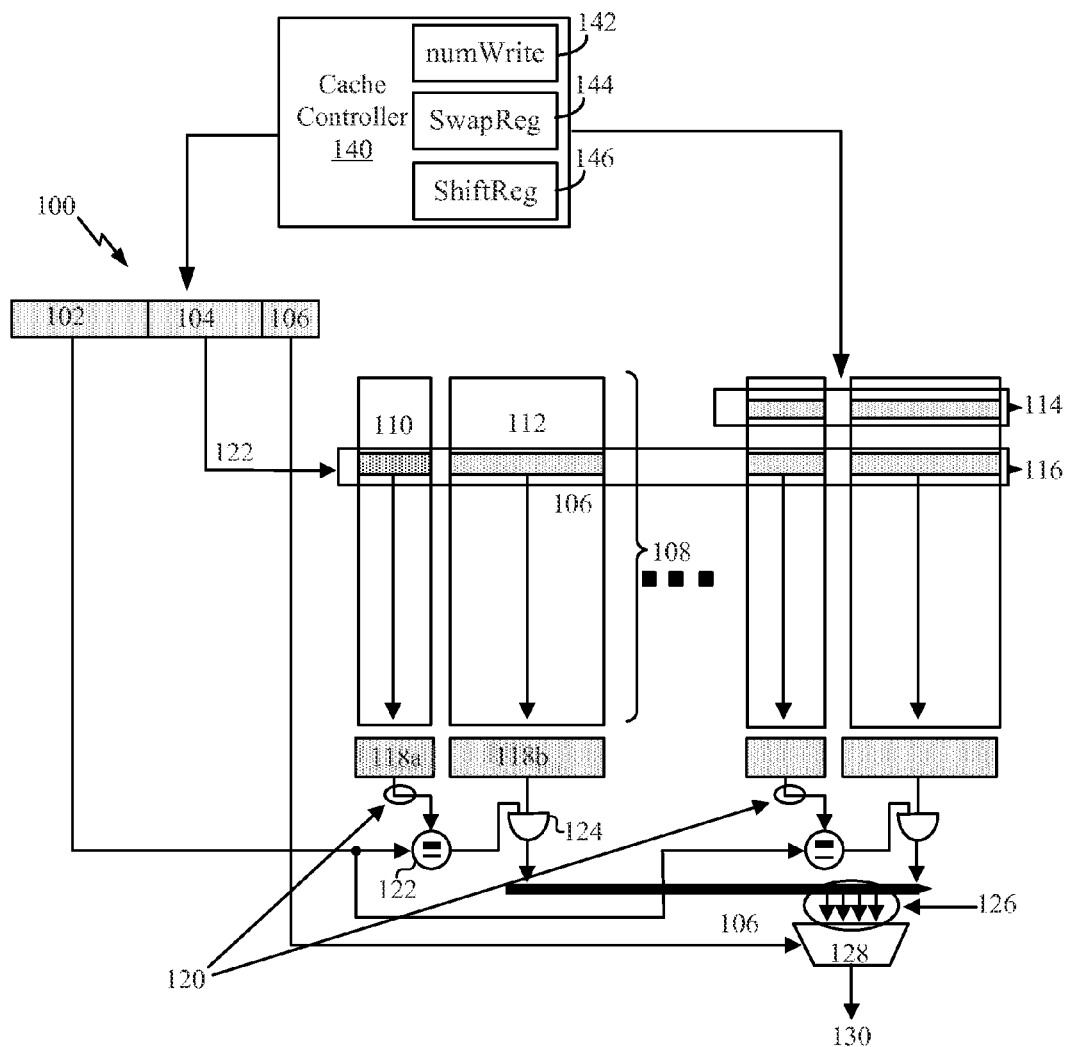
FIG. 1 is a diagram of an example cache memory including a cache controller for wear-leveling of the cache memory according to an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Memories such as static random access (SRAM) and embedded dynamic RAM (eDRAM) are commonly used for on-chip cache design in modern microprocessors. Modern computers and devices also specify larger on-chip caches, but the scalability of traditional SRAM or eDRAM caches is increasingly constrained by technology limitations such as leakage power and cell density. Recently, new non-volatile memory (NVM) technologies such as, for example, phase-change random access memory (RAM) spin-torque transfer RAM, and resistive RAM have been explored as promising alternative memory technologies to be used for on-chip caches. Compared to traditional memories such as SRAM and eDRAM, these emerging non-volatile memory technologies have common advantages of high density, low standby power, low voltage, better scalability and non-volatility. However, their adoption is hampered by their limited write endurance. This problem will be amplified by the existing cache management policies resulting in unbalanced write traffic on cache blocks because such policies are not write variation aware. These policies were originally designed for SRAM caches and result in significant non-uniformity in terms of writing to cache blocks, which causes heavily-written cache blocks to fail much faster or earlier than most other blocks.

Many wear-leveling techniques have been proposed to extend the lifetime of non-volatile memory technologies, but the difference between cache and main memory operational mechanisms make the existing wear-leveling techniques for non-volatile memories inadequate for non-volatile caches. To address these issues and to reduce inter-set write variations, a swap-shift scheme is provided to reduce cache inter-set write variations for non-volatile memory caches. The scheme has a very small hardware overhead, only using one global counter and two global registers. By adopting this scheme, the lifetime of low-level on-chip non-volatile memory caches can be improved.

Write variation is a significant concern in designing any cache or memory subsystem that use non-volatile memories with limited write endurance. Large write variation may greatly degrade product lifetime, because only a small subset of memory cells that experience the worst-case write traffic can result in a dead cache or memory subsystem even when the majority of the cells are far from wear-out.

FIG. 1 is a diagram of an example cache memory 100 including a cache controller 140 for inter-set wear-leveling of the cache memory 100 according to an aspect of the present disclosure. A cache memory 100 includes a page number 102, a set number 104, a byte number 106, a cache way 108, a tag portion 110, a data portion 112, a cache block 114, cache sets 116, a tag sense amplifier 118a, a data sense amplifier 118b, a tag output 120, a comparator 122, a logic gate 124, a cache group 126, a select circuitry 128 and a word output 130.

An address in the cache memory 100 may include a page number 102, a set number 104 and a byte number 106. In one implementation, the page number 102 may be a virtual page number. The set number 104 corresponds to one of the cache sets 116. A cache block 114 includes a tag portion 110 and a data portion 112. The tag portion 110 may contain part of the address of the actual data in the data portion 112, or other identifying information to locate the data in the data portion 112. The data portion 112 contains the actual data. The one of the cache sets 116 is one set of cache blocks 114, as can be seen by the horizontal grouping in FIG. 1. The cache way 108 is another group of cache blocks 114, but in a vertical grouping, as can be seen in FIG. 1. The tag sense amplifier 118a and data sense amplifier 118b sense logic levels from the cache entries so the data is properly interpreted (as a 1 or 0) when output.

The data at the tag output 120, which is the output of the tag sense amplifier 118a, may contain a page frame number, a valid bit and coherence bits. The data from the tag output 120 is then compared to the page number 102 by the comparator 122, which sees if the two values are equal. If the values are equal and there is a hit, then the output of the comparator 122 is input, along with the output of the data sense amplifier 118b, into the logic gate 124. The output of the logic gate 124 appears in the cache group 126. In one implementation, one of the cache groups 126 contains multiple words. The cache group 126 is input into a select circuitry 128 which uses the byte number 106 as a select input. The output of the select circuitry 128 using the byte number 106 as the select input is the word output 130.

FIG. 1 is also an example block diagram for an n-way set-associative cache, and there may be other types of caches used for the present disclosure. A set-associative cache can be made of several direct-mapped caches operated in parallel (for example, one direct-mapped cache could be a cache entry including the tag portion 110 and the data portion 112). The data read-out may be controlled by a tag comparison with the page number 102 as well as the block-valid bit (which can be part of the tag or metadata entry) and the page permissions (part of the page number 102). The cache column size may also equal the virtual memory page size, and the cache index may not use pits from the page number 102 or virtual page number.

Individual ones of the cache blocks 114 are grouped into one of the cache sets 116 in one direction, and into a cache way 108 in another direction. The cache blocks 114 may also have load distributions, depending on how often they are written to. Some of the cache blocks 114 are heavily written to and others of the cache blocks 114 are rarely written. Therefore, this causes inter-set write variation. Inter-set write variation occurs among the cache sets 116 that vary in terms of writing activity. That is, the cache blocks 114 from one of the cache sets 116 may be written more or less than the cache blocks 114 from another of the cache sets 116. Furthermore, when different cache sets 116 are written to as a whole compared to others of the cache sets 116, inter-set write variation also occurs.

In this configuration, the cache controller 140 evenly distributes writing traffic to the different rows and to the different columns for the cache ways 108. Although the cache ways 108 are shown as occupying columns and the cache sets 116 are shown as occupying rows in FIG. 1, the implementation of the cache memory 100 is not limited to this configuration. In particular, the cache ways 108 may occupy rows or other structures that may not be columns within the cache memory 100, and the cache sets 116 may occupy columns or other structures that may not be rows within the cache memory 100.

Main memory wear-leveling techniques usually use data movement to implement the address re-mapping. This is because in main memory, the data cannot be lost and can be moved to a new position after each re-mapping. Nevertheless, data movement operations always incur area and performance overhead. First, data movement needs a temporary data storage location to receive the data. Second, one cache set movement involves several block read and write operations. Therefore, the cache port is blocked during the data movement and system performance is consequentially degraded. When one example data movement scheme is extended from main memory to being applied to memory caches, one additional cache set (the gap set) is added and the data from one set to the gap set is moved periodically. Because cache techniques are more performance sensitive, main memory wear-leveling techniques cannot be used directly. Therefore, the use of data movement may be reconsidered when designing cache inter-set wear-leveling techniques.

Another option for implementing set address re-mapping for non-volatile memory caches is to perform data invalidation. Cache line invalidations can be used because the data in caches can be read back again later from lower-level memories. This special feature of caches provides a new opportunity designing cache inter-set wear-leveling techniques.

Compared to data movement, invalidations do not incur any area overhead. Therefore, one aspect of the present disclosure modifies previous main memory wear-leveling techniques and enhances them by using a swap-shift wear-leveling scheme to reduce the inter-set write variation in non-volatile memory caches using invalidations.

In contrast to existing wear-leveling techniques for non-volatile main memories, the swap-shift scheme is designed for non-volatile memory caches. The swap-shift scheme uses data invalidation instead of data movement when changing the set address mapping in order to decrease both the area and the performance overhead.

One configuration of the swap-shift scheme shifts the mapping of cache physical sets to rotate the stored data between sets. Nevertheless, shifting all cache sets at one time results in a significant performance overhead. To solve this problem, the swap-shift scheme of the cache controller 140 only swaps the mapping of two sets at one time, and all cache sets can be shifted by one step after a complete swap rotation.

In this configuration, the cache controller 140 includes a global counter 142 that is used in the swap-shift scheme to store the number of memory write operations to the cache, which is denoted by the variable name "numWrite." The cache controller 140 also includes a swap register 144 (SwapReg) the is used to store the current swapping value. SwapReg is initially set to 0 and cyclically changed from 0 to N−1, where N is the number of sets in the cache. The cache controller 140 further includes a shift register 146 (ShiftReg) that stores the current shifting value. ShiftReg is changed from 0 to N cyclically. These two values, SwapReg and ShiftReg, are used by the cache controller 140 to control two types of rotations in the shift-swap scheme, the swap rotation and the shift rotation.

First, the swap rotation is described. SwapReg is incremented by 1 when numWrite is equal to a specific predefined threshold ("threshold"), and one swap rotation occurs when SwapReg is moved by N−1 steps. Therefore, one swap rotation consists of N−1 swaps.

Second, the shift rotation will be described. ShiftReg is incremented by 1 after each swap rotation, and one shift rotation occurs when ShiftReg is moved by N steps. Therefore, each shift rotation consists of N swap rotations.

Figure 2:
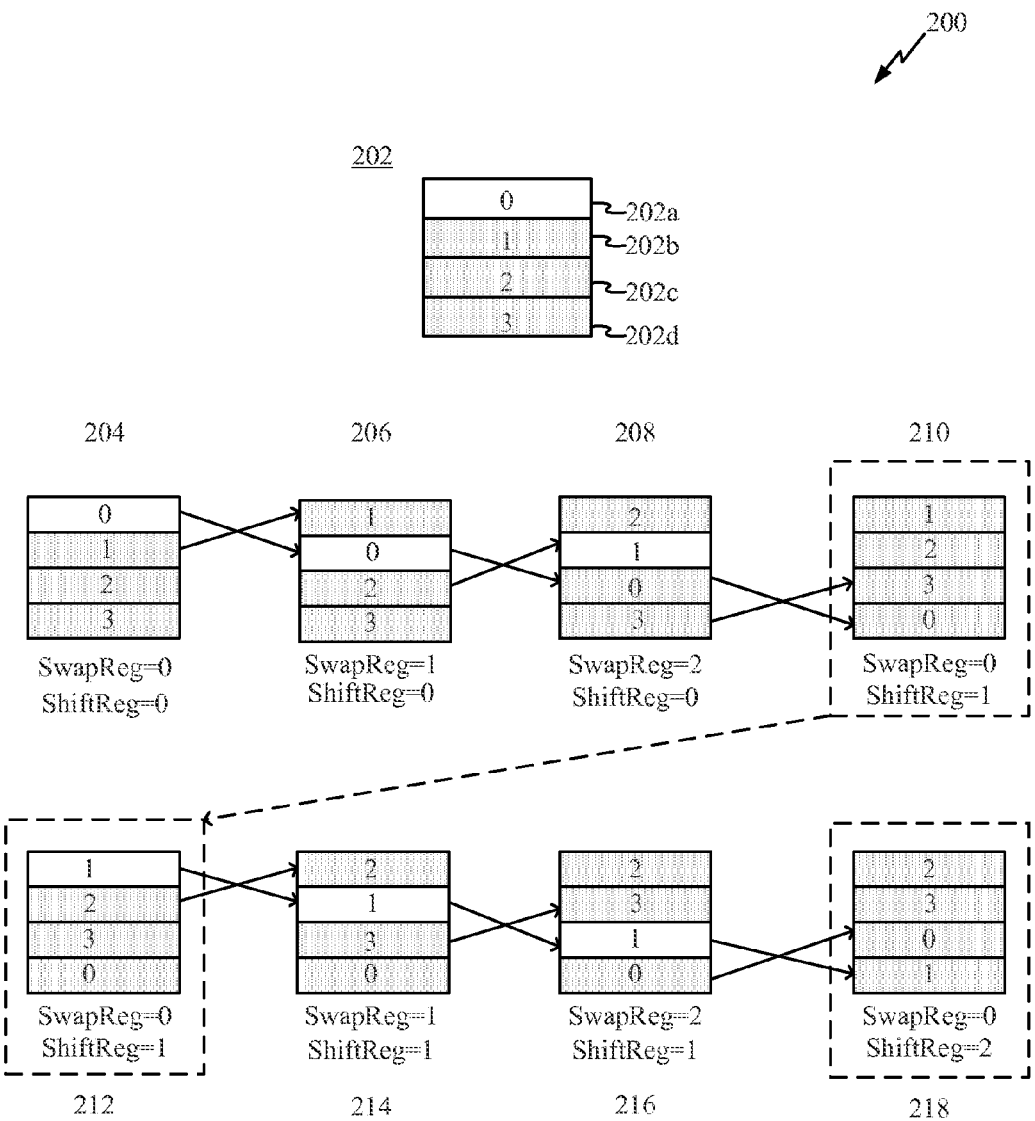
FIG. 2 is a diagram showing an example rotation for wear-leveling according to an aspect of the present disclosure.

FIG. 2 is a diagram 200 showing an example rotation for wear-leveling according to an aspect of the present disclosure. The diagram 200 includes a cache structure 202 and a set of rotation boxes 204, 206, 208, 210, 212, 214, 216 and 218. The cache structure 202 is any structure that includes cache blocks 114, cache ways 108 or cache sets 116, and may include the entirety of the cache memory 100 itself, although for simplicity the cache structure 202 is represented as having a group of cache sets 202a, 202b, 202c and 202d. The first cache set 202a, the second cache set 202b, the third cache set 202c and the fourth cache set 202d are example cache sets shown for the rotation example of the diagram 200, although the number of cache sets or sub-structures of the cache structure 202 is not limited to four. The rotation process is now be described.

In rotation box 204, the cache structure 202 is in its initial position, with the first cache set 202a labeled with a "0", the second cache set 202b labeled with a "1", the third cache set 202c labeled with a "2", and the fourth cache set labeled with a "3". There may also be data stored within each of the cache sets 202a, 202b, 202c and 202d. A SwapReg counter counts the number of times the cache sets have been swapped. The counter may be initialized to 0. A ShiftReg counter counts the number of times the entirety of the cache structure 202 has shifted positions (in that all of the cache sets within the cache structure 202 has been moved one position) may also be initialized and set to 0. The conventional approach for rotation uses a temporary block and clears all the cache sets or cache structures over time. Nevertheless, with the implementation shown in the diagram 200, a temporary block is not used, nor are the data contents of the cache sets deleted or flushed. This is true because the data is not actually swapped and kept in the same location or position. Only the positions of the cache sets are being swapped, and only the contents from the swapped cache sets are cleared, leaving the contents of all the other cache sets intact. Each of the cache sets are also moved to their new location and new data is auto-loaded into the new cache set, without having to move any data. Again, the only thing that is swapped is the location of the cache sets. Everything is done with swap operations, instead of actually moving data.

In rotation box 206, the position of the first cache set 202a (0) is swapped with the position of the second cache set 202b (1). As a result, the second cache set 202b (1) is now the very first or top cache set, and the first cache set 202a (0) becomes the second cache set, next to or below the first cache set 202a (0). In one implementation, once this swap occurs, new data will be auto-reloaded into the new cache sets once in their new positions. In one implementation, the swapped cache sets will retain their data, so new data will not be auto-reloaded into the cache sets once they are swapped. The SwapReg counter, which counts the number of times the cache sets have been swapped, may also be incremented by 1. In rotation box 208, the position of the first cache set 202a (0) (now in the second position, the old position of the second cache set 202b (1)) is swapped with the position of the third cache set 202c (2). Now, the third cache set 202c (2) becomes the second position (former position of the second cache set 202b (1)), and the first cache set 202a (0) becomes the third position (former position of the third cache set 202c (2)). The SwapReg counter may be then be incremented by 1 again.

In the rotation box 210, the position of the first cache set 202a (0) (now in the third position, the old position of the third cache set 202c (2)) is swapped with the position of the fourth cache set 202d (3). Now, the fourth cache set 202d (3) becomes the third position (former position of the third cache set 202c (2)), and the first cache set 202a (0) becomes the fourth position (former position of the fourth cache set 202d (3)). The SwapReg counter may then be initialized because all the cache sets have been shifted, and the ShiftReg counter becomes incremented because after three rounds of swapping, all the registers within the cache structure 202 have been shifted by one position.

Continuing on to the rotation box 212, the position of the second cache set 202b (1) is swapped with the position of the third cache set 202c (2). Now, the second cache set 202(b) (1) becomes the second position (former position of the third cache set 202c (2)), and the third cache set 202c (2) becomes the first position (former position of the second cache set 202b (1)). The SwapReg counter also becomes incremented by 1. In rotation box 214, the position of the second cache set 202b (1) is swapped with the position of the fourth cache set 202d (3). Now, the fourth cache set 202d (3) becomes the second position (former position of the second cache set 202b (1)), and the fourth cache set 202d (3) becomes the second position (former position of the second cache set 202b (1)). The SwapReg counter also increments by 1. In rotation box 216, the position of the second cache set 202(b) (1) is swapped with the position of the first cache set 202(a) (0). Now, the second cache set 202(b) (1) becomes the fourth position (former position of the first cache set 202a (0)), and the first cache set 202a (0) becomes the third position (former position of the second cache set 202b (1)). The SwapReg counter is then initialized and the ShiftReg counter increments by 1 because after another three rounds of swapping, all the registers within the cache structure 202 have been shifted by two positions.

In one implementation, the contents of the entire cache are not flushed because everything is done by swap operations. Furthermore, swap operations do not involve any performance degradation. By using swap operations to perform the swapping, "shift up" operations and/or tracking does not occur. In one implementation, the data is not swapped, just the positions, and the data is then reloaded into the new swapped location. In one implementation, the data in un-used positions is simply discarded, such as invalid cache sets. In one implementation, for one swap, the contents of the cache set corresponding to the SwapReg counter position (e.g., cache-register[SwapReg]) and the contents of the cache set corresponding to the SwapRea counter plus one (e.g., cache-register[SwapReg+1]) may be discarded. Then, their physical locations are swapped. After N-1 swaps, where N is the number of cache sets in the cache structure, all the physical locations within the cache structure (each of the cache sets are all shifted by 1.

In one implementation, the SwapReg and ShiftReg counters may be implemented as the swap register 144 and the shift register 146 of the cache controller 140 for storing data, as shown in FIG. 1. In this case, the registers are implemented as some sort of numerical data that keeps track of the value for their respective counters.

Figure 3:
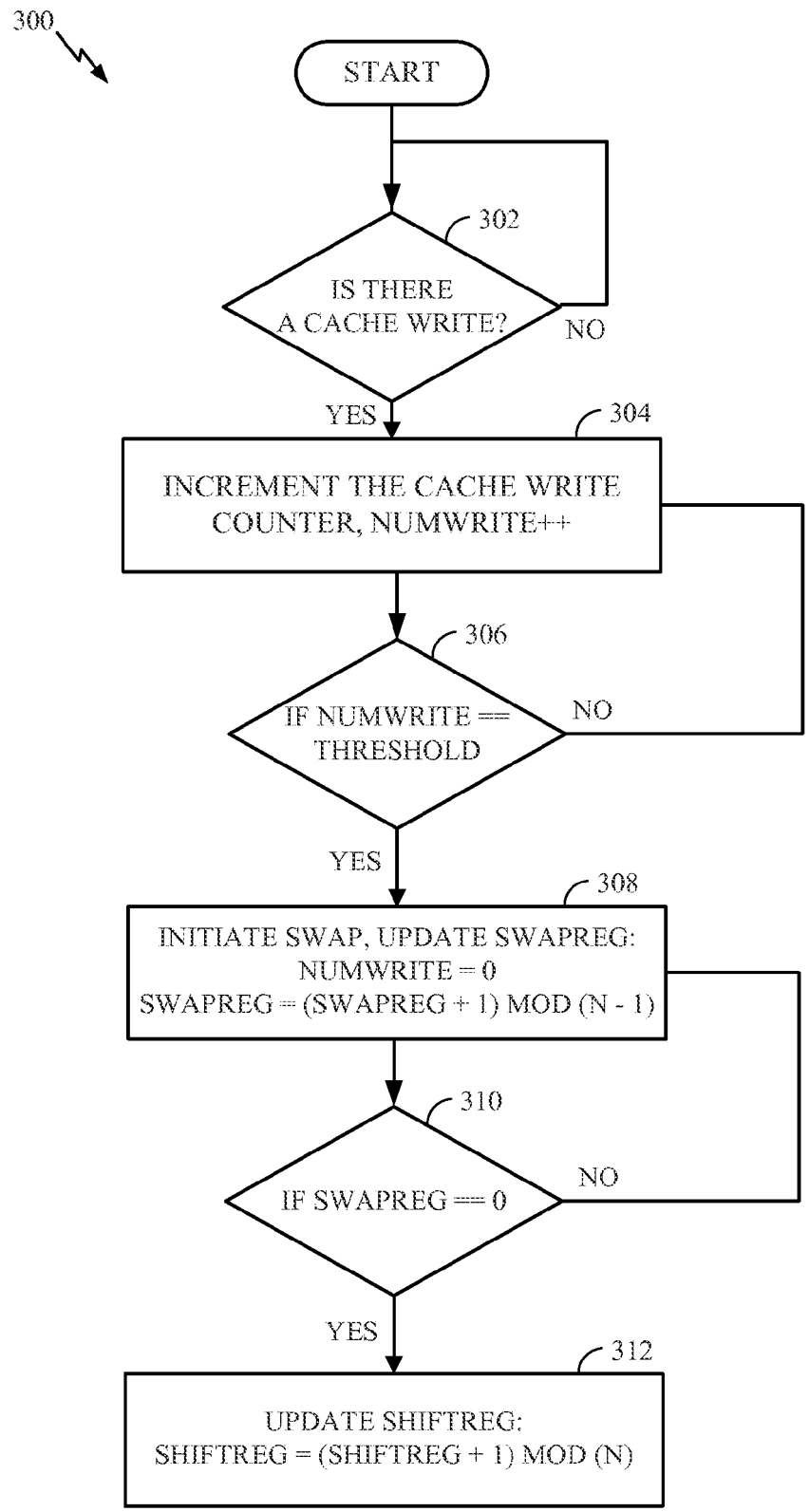
FIG. 3 is a logic flowchart showing operation of wear-leveling according to an aspect of the present disclosure.

FIG. 3 is a logic flowchart 300 showing the operation of a cache controller for wear-leveling a cache memory according to an aspect of the present disclosure. FIG. 3 shows how the ShiftReg and SwapReg counters are updated in a wear-leveling system with respect to writing activity. In block 302, it is determined whether there has been a cache write. If there is a cache write, then in block 304, a cache write counter known as "numWrite" is incremented by one. If there is not a cache write, the process goes back to before block 302. The numWrite counter also triggers when to swap. There is also some predetermined threshold value that determines how many writes is enough to initiate a swap of a cache set. For example, in block 306, it is determined whether the numWrite counter is equal to the predetermined threshold. If so, then in block 308, a swap is initiated, updating the numWrite counter to a zero value and updating the SwapReg counter to the value of (SwapReg+1) mod (N-1). Mod is the modulo operator and N is the total number of cache sets in the selected cache structure. In block 306, if the numWrite counter is not equal to the predetermined threshold, then the process goes back to block 304. In block 310, it is determined whether the SwapReg counter is equal to zero. If so, then in block 312, the ShiftReg counter is updated to the value of (ShiftReg+1) mod N. This shifts the entire cache structure by one. In block 310, if the value of the SwapReg counter is not equal to zero, then the process goes back to block 308.

FIG. 3 may also be expressed by the following pseudo code:

```
If (there is a cache write),
  then: numWrite++;
  If (numWrite == threshold),
    then: numWrite = 0;
    then: SwapReg = (SwapReg + 1) mod (N-1);
    if (SwapReg ==0),
      then: ShiftReg = (ShiftReg + 1) mod (N).
```

Figure 4:
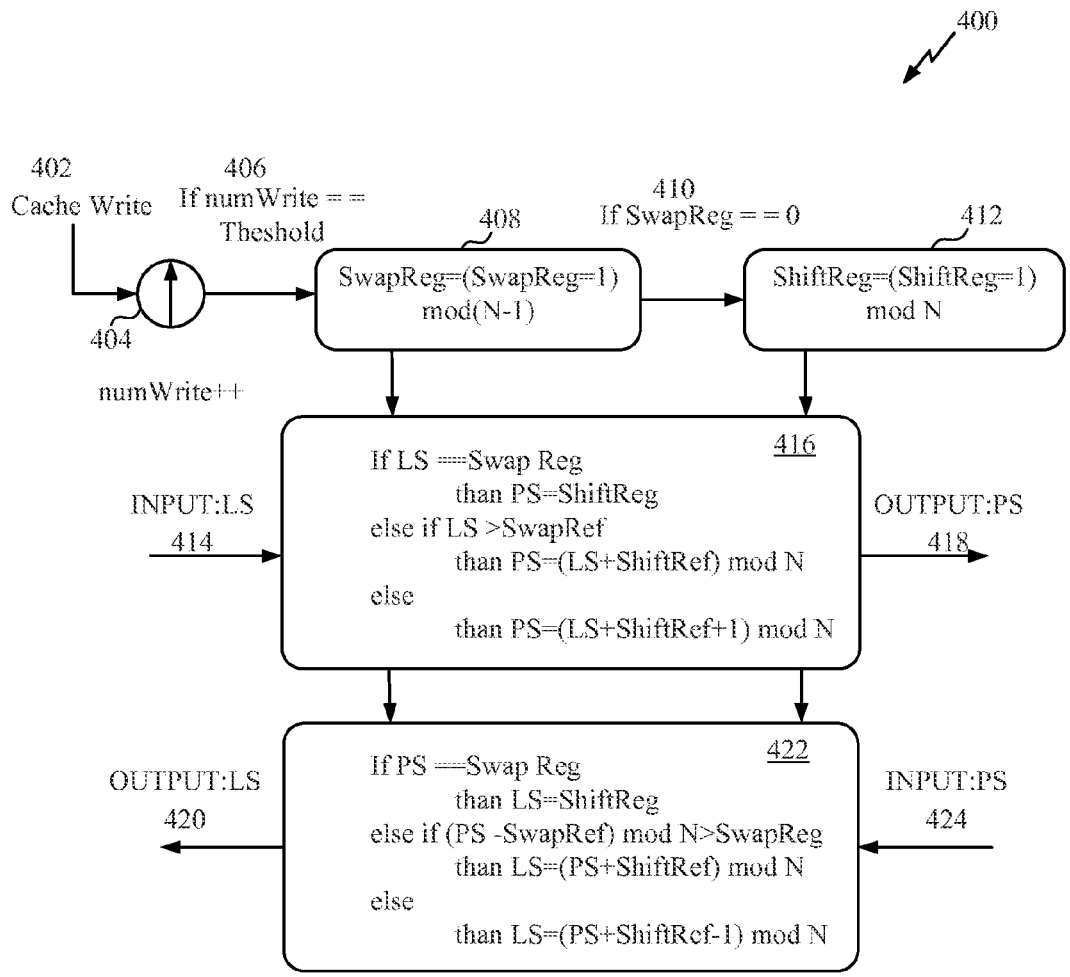
FIG. 4 is a logic flowchart showing the operation of wear-leveling according to an aspect of the present disclosure.

FIG. 4 is a logic flowchart 400 showing the operation of a cache controller for wear-leveling a cache memory according to an aspect of the present disclosure. FIG. 4 shows a global counter 404 storing a numWrite counter that represents the number of writes, each write represented by the cache write action 402. The SwapReg counter (reflected as "SwapReg") and the ShiftReg counter (expressed as "ShiftReg") may be implemented as data registers for respectively storing the SwapReg and ShiftReg values.

As described with respect to FIG. 3, if there is a cache write 402, then the global counter 404 is increased. If the global counter is equal to a predetermined threshold value at 406, at block 408 a swap occurs, updating the SwapReg counter to the value of (SwapReg+1) mod (N-1), where mod is the modulo operator and N is the number of total cache sets. If SwapReg is zero (410), then in block 412, the ShiftReg counter is updated to the value of (ShiftReg+1) mod N.

When a logical set (LS) number comes in as a logical set number input 414, the physical set (PS) number can be computed as a physical set number output 418 based on three different situations.

First, as shown in logic box 416, if the logical set number input 414 is equal to the SwapReg value, it means that this logical set is exactly the cache set that should be swapped in this rotation. Therefore, the physical set is mapped to the current shift value of ShiftReg and output as the physical set number output 418.

Second, as also shown in logic box 416, if the logical set number input 414 is larger than the SwapReg value, it means that this cache set has not been shifted in this rotation and keeps the same mapping as the last rotation. Therefore, the physical set is mapped to LS+ShiftReg. In one implementation, the mapping is done by taking the (LS+ShiftReg) value and performing a modulo operation with N, the number of cache sets, and then assigning the resulting value to the physical set.

Third, as also shown in logic box 416, if the logical set number input 414 is smaller than the SwapReg value (the else clause), it means that this cache set has been shifted in this rotation. Therefore, the physical set is mapped to LS+ShiftReg+1. In one implementation, mapping is done by taking the (LS+ShiftReg+1) value and performing a modulo operation with N, the number of cache sets, and then assigning the resulting value to physical set.

Three operations similar to the operations discussed above occur in logic box 422, but for the physical set input number 424 in order to compute a logical set number output 420.

When the cache line needs to be written back into the lower level memory, the logical set address is re-generated. The mapping from physical set to logical set is symmetrical. This mapping scheme can also be verified as can be seen in FIG. 2. Because SwapReg and ShiftReg are changed along with increasing write counts, the mapping between logical set and physical set is changing all the time, which ensures the writes to different physical sets are balanced, reducing write variations.

Compared to conventional cache architectures, the set index translation in the shift-swap wear-leveling scheme only adds a simple arithmetic operation and can be merged into the row-decoder. In addition, this one-cycle latency overhead is only paid on higher-level cache misses that access lower-level caches.

Figure 5:
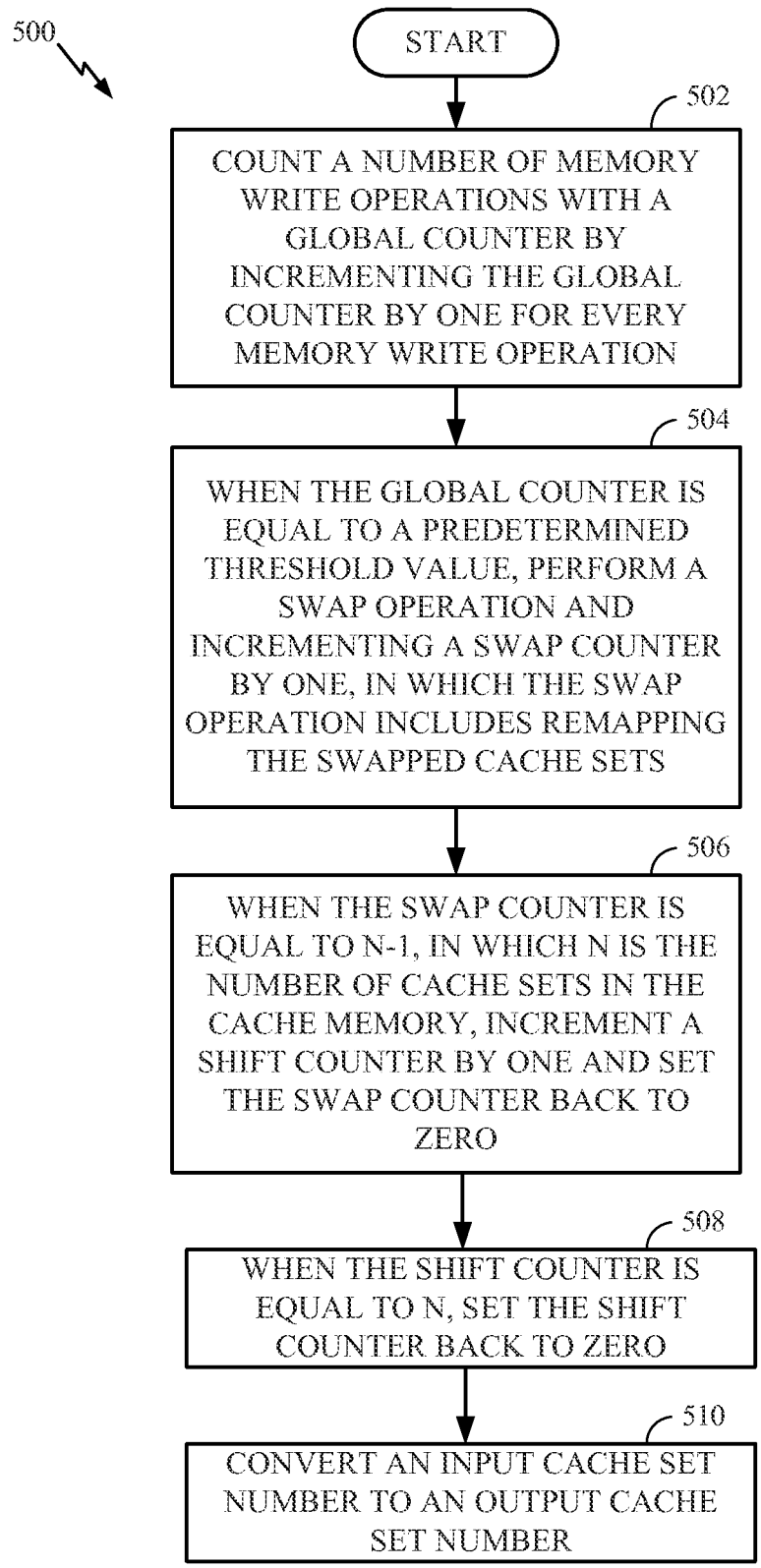
FIG. 5 is a process flow diagram illustrating a method for wear-leveling according to an aspect of the present disclosure.

FIG. 5 is a process flow diagram 500 illustrating a method for wear-leveling according to an aspect of the present disclosure. In block 502, a number of memory write operations are counted by a global counter by incrementing the global counter by one for every memory write operation. In block 504, when the global counter is equal to a predetermined threshold value, a swap operation is performed and a swap counter is incremented by one. Also, performing the swap operation includes remapping the swapped cache sets, which in turn includes placing dirty data within the two swapped cache sets into the write back buffer and invalidating the other data in the two swapped cache sets.

In block 506, when the swap counter is equal to N-1, a shift counter is incremented by one and the swap counter is set back to zero. N is the number of cache sets in the cache memory. In block 508, when the shift counter is equal to N, the shift counter is set back to zero. In block 510, an input cache set number is converted into an output cache set number. The input or output cache set number may be the logical set number or the physical set number.

Figure 6:
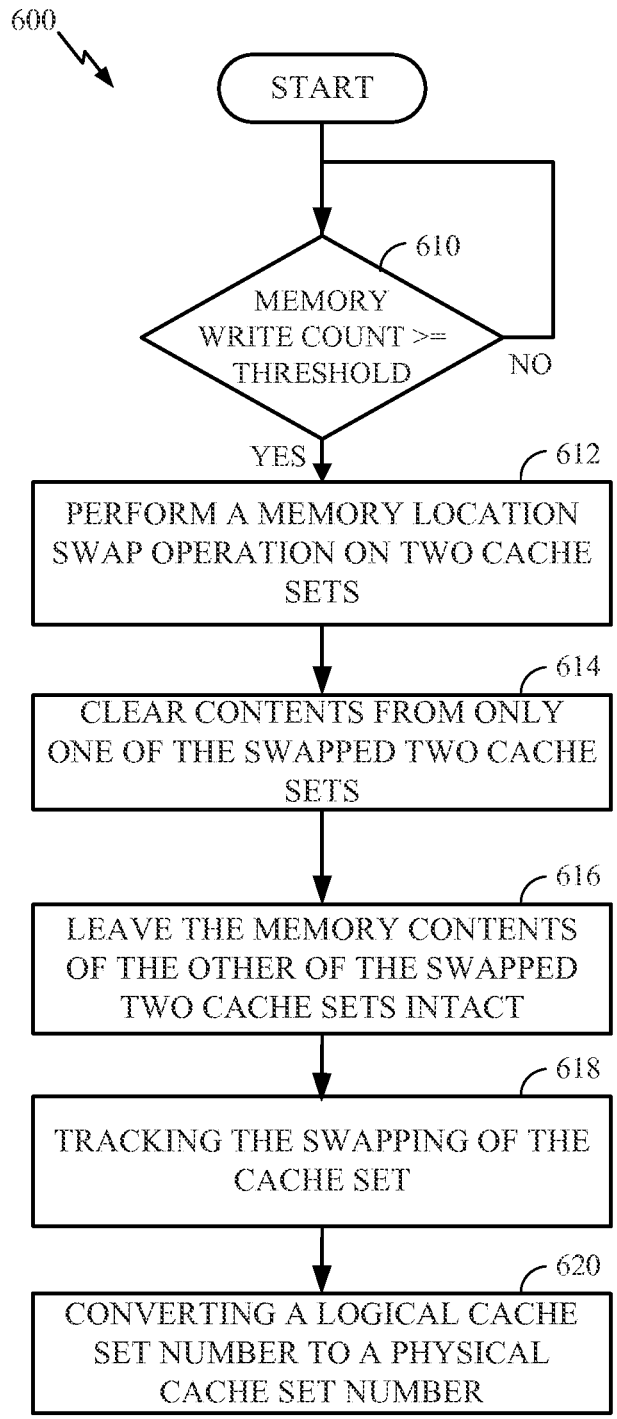
FIG. 6 is a process flow diagram illustrating a method for wear-leveling according to an aspect of the present disclosure.

FIG. 6 is a process flow diagram 600 illustrating a method for wear-leveling according to an aspect of the present disclosure. In block 610, it is determined whether a number of memory write operations to a cache memory (e.g., num-Writes) has reached a predetermined threshold. If so, in block 612 a memory location swap operation is performed on two cache sets. In block 614, the contents from one of the two swapped cache sets are cleared, in block 616, the memory contents of the other of the swapped two cache sets are left intact. In block 618, the swapping of the cache set is tracked. In block 620, a logical cache set number is converted to a physical cache set number. If the number of write operations has not reached the threshold, the process remains at block 610.

In the swap-shift wear-leveling scheme, the inter-set write variation reduction is related to the number of shift rotations during the experimental time. Assuming there are N sets in the cache, one shift rotation includes N swap rotations and one swap rotation in the swap-shift scheme needs N−1 swaps. After each shift rotation, all cache sets are shifted by N steps and logical set indices are mapped to their original positions. Therefore, the more rounds the cache is shifted, the more evenly the write accesses are distributed to each cache set.

According to a further aspect of the present disclosure, a cache controller for wear-leveling of a cache memory is described. The cache controller includes a means for dynamically rotating cache sets of the cache memory by performing a plurality of memory location swap operations on the cache sets when a number of memory write operations to the cache memory reaches a threshold value. Each swap operation may include clearing contents from only swapped cache sets, while leaving memory contents of other cache sets intact. The dynamically rotating means may be the cache controller 140. The apparatus further includes a means for tracking the swapped cache sets to convert a logical cache set number to a physical cache set number. The tracking means may be the cache controller 140, the global counter 142, the swap register 144, and/or the shift register 146. In another aspect, the aforementioned means may be any module or any apparatus configured to perform the functions recited by the aforementioned means.

Figure 7:
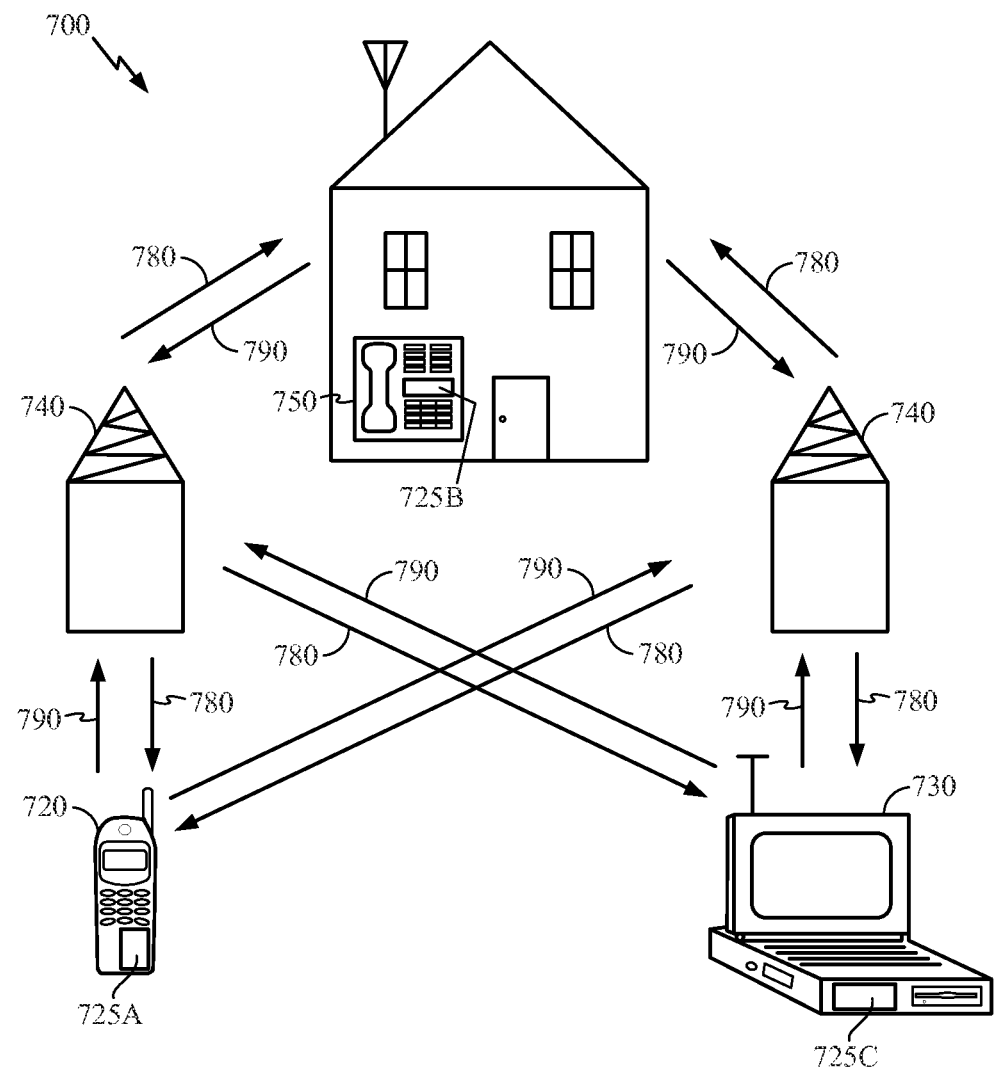
FIG. 7 is a block diagram showing an exemplary wireless communication system in which a configuration of the disclosure may be advantageously employed.

FIG. 7 is a block diagram showing an exemplary wireless communication system 700 in which an aspect of the disclosure may be advantageously employed. For purposes of illustration, FIG. 7 shows three remote units 720, 730, and 750 and two base stations 740. It will be recognized that wireless communication systems may have many more remote units and base stations. Remote units 720, 730, and 750 include IC devices 725A, 725C, and 725B that include the disclosed cache memory. It will be recognized that other devices may also include the disclosed cache memory, such as the base stations, switching devices, and network equipment. FIG. 7 shows forward link signals 780 from the base station 740 to the remote units 720, 730, and 750 and reverse link signals 790 from the remote units 720, 730, and 750 to base stations 740.

In FIG. 7, remote unit 720 is shown as a mobile telephone, remote unit 730 is shown as a portable computer, and remote unit 750 is shown as a fixed location remote unit in a wireless local loop system. For example, the remote units may be mobile phones, hand-held personal communication systems (PCS) units, portable data units such as personal data assistants, global positioning system (GPS) enabled devices, navigation devices, set top boxes, music players, video players, entertainment units, fixed location data units such as meter reading equipment, or other devices that store or retrieve data or computer instructions, or combinations thereof. Although FIG. 7 illustrates remote units according to the aspects of the disclosure, the disclosure is not limited to these exemplary illustrated units. Aspects of the disclosure may be suitably employed in many devices, which include the disclosed cache memory.

Figure 8:
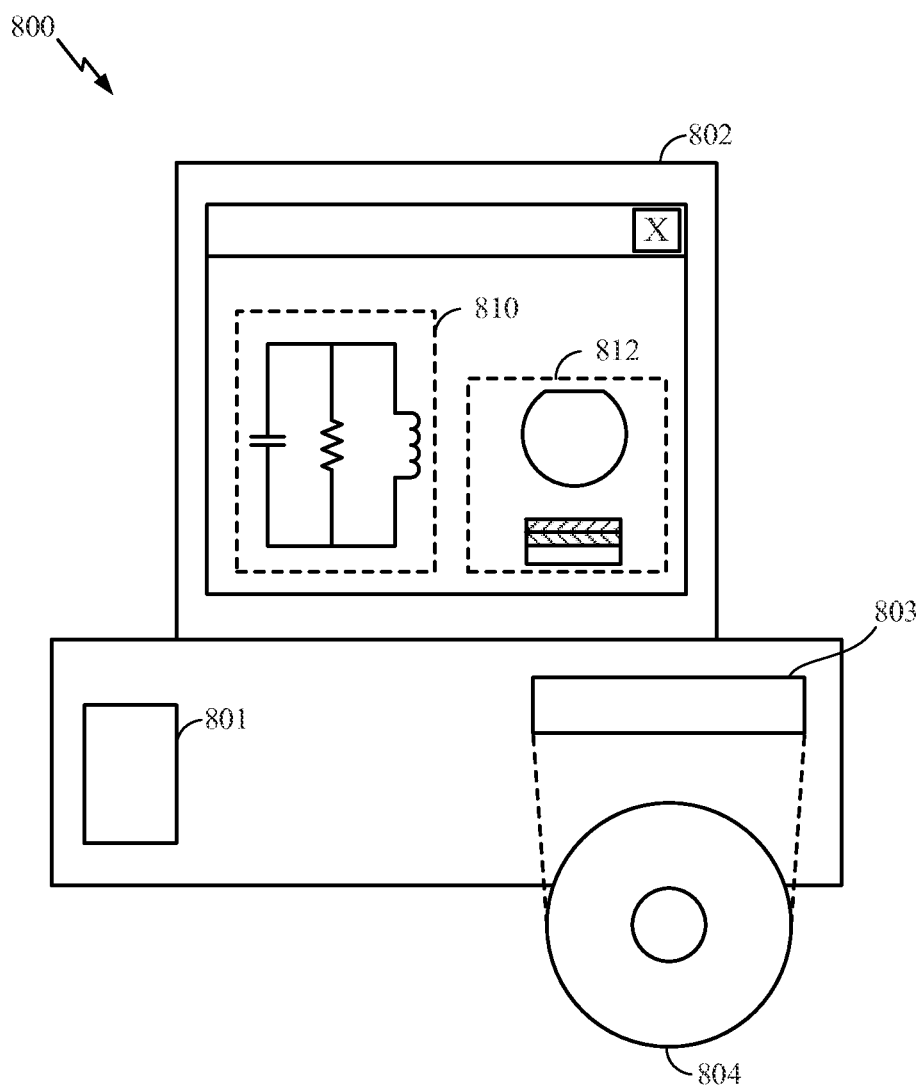
FIG. 8 is a block diagram illustrating a design workstation used for circuit, layout, and logic design of a semiconductor component according to one configuration.

FIG. 8 is a block diagram illustrating a design workstation used for circuit, layout, and logic design of a semiconductor component, such as the cache memory disclosed above. A design workstation 800 includes a hard disk 801 containing operating system software, support files, and design software such as Cadence or OrCAD. The design workstation 800 also includes a display 802 to facilitate design of a circuit 810 or a semiconductor component 812, such as a cache memory. A storage medium 804 is provided for tangibly storing the circuit design 810 or the semiconductor component 812. The circuit design 810 or the semiconductor component 812 may be stored on the storage medium 804 in a file format such as GDSII or GERBER. The storage medium 804 may be a CD-ROM, digital versatile disc (DVD), hard disk, flash memory, or other appropriate device. Furthermore, the design workstation 800 includes a drive apparatus 803 for accepting input from or writing output to the storage medium 804.

Data recorded on the storage medium 804 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 804 facilitates the design of the circuit design 810 or the semiconductor component 812 by decreasing the number of processes for designing semiconductor wafers.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A method for wear-leveling of an on-chip, non-volatile cache memory, comprising:
dynamically rotating cache sets of the on-chip, non-volatile cache memory by performing a plurality of memory location swap operations on the cache sets when a number of memory write operations to the cache memory reaches a threshold value, each swap operation including invalidating contents from cache sets being swapped and leaving memory contents of other cache sets intact by swapping a mapping of at least two of the cache sets being swapped at a time without moving contents of the at least two of the cache sets being swapped between the cache set, and shifting the cache sets by at least one step after a complete swap rotation; and
tracking the swapped cache sets to convert a logical cache set number to a physical cache set number.

2. The method of claim 1, in which dynamically rotating the cache sets further comprises:
counting the number of memory write operations to the cache memory in a global counter;
initiating the plurality of memory location swap operations when the global counter reaches the threshold value; and
resetting the global counter.

3. The method of claim 2, in which dynamically rotating the cache sets comprises:
setting a swap register (SwapReg) to (the SwapReg+1) mod (N−1), in which N is a number of the cache sets in the cache memory; and
setting a shift register (ShiftReg) to (the ShiftReg+1) mod N when the SwapReg is zero.

4. The method of claim 1, further comprising:
counting the number of memory write operations to the cache memory with a global counter by incrementing the global counter for each memory write operation to the cache memory;
performing a swap operation and incrementing a swap counter when the global counter equals the threshold value;
incrementing a shift counter and resetting the swap counter value when a swap counter value equals N−1, in which N is a number of the cache sets in the cache memory; and
when a shift counter value equals N, resetting the shift counter.

5. The method of claim 1, in which swapping memory locations of the at least two of the swapped cache sets comprises:
storing dirty data within the at least two swapped cache sets into a write back buffer; and
invalidating other data in the at least two swapped cache sets.

6. The method of claim 4, further comprising converting an input cache set number to an output cache set number by:

setting an output physical set number to the shift counter value when an input logical set number equals the swap counter value;

setting the output physical set number to (the input logical set number+the shift counter value) modulo N when the input logical set number is greater than the swap counter value; and setting the output physical set number to (the input logical set number+the shift counter value+1) modulo N when the input logical set number is less than the swap counter value.

7. The method of claim 4, in which tracking the swapped cache sets comprises:

setting an output logical set number to the swap counter value when an input physical set number equals the shift counter value;

setting the output logical set number to (the input physical set number−the shift counter value) modulo N when (the input physical set number−the shift counter value) modulo N is greater than the swap counter value; and otherwise, setting the output logical set number to (the input physical set number−the shift counter value−1) modulo N.

8. The method of claim 1, further comprising integrating the cache memory into a mobile phone, a set top box, a music player, a video player, an entertainment unit, a navigation device, a computer, a hand-held personal communication systems (PCS) unit, a portable data unit, and/or a fixed location data unit.

9. A cache controller, comprising:

a first register that updates after each memory location swap operation on a plurality of cache sets of an on-chip, non-volatile cache memory, and resets at each N−1 memory location swap operations, in which N is a number of cache sets in the cache memory; and a second register that updates after every N−1 memory location swap operations on the plurality of cache sets of the on-chip, non-volatile cache memory, and resets every $(N^2-N)$ memory location swap operations, in which the first register and the second register track a relationship between logical locations and physical locations of the cache sets and in which each swap operation includes invalidating contents from cache sets being swapped, and leaving memory contents of other cache sets intact by swapping a mapping of at least two of the cache sets being swapped at a time without moving contents of the at least two of the cache sets being swapped between the cache sets, and shifting the cache sets by at least one step after a complete swap rotation.

10. The cache controller of claim 9, in which the cache controller is operable to dynamically swap two memory locations and to track the swap operations of the cache sets to convert a logical cache set number to a physical cache set number using the first register and the second register.

11. The cache controller of claim 9, in which the first register is a swap register (SwapReg) that is set to (the SwapReg+1) mod (N−1) when a memory swap operation is performed.

12. The cache controller of claim 11, in which the second register is a shift register (ShiftReg) that is set to (the ShiftReg+1) mod N when the SwapReg equals zero.

13. The cache controller of claim 9, in which the first register is a swap register (SwapReg) that is set to (the SwapReg+1) mod (N−1) when a memory swap operation is performed, and in which the second register is a shift register (ShiftReg) that is set to (the ShiftReg+1) mod N when the SwapReg equals zero.

14. The cache controller of claim 13, in which the cache controller is operable to dynamically swap two memory locations and to track the swap operations of the cache sets to convert a logical cache set number to a physical cache set number using the SwapReg and the ShiftReg.

15. The cache controller of claim 9, in which the cache controller is operable to initiate the memory location swap operation when a write counter register equals a threshold value.

16. The cache controller of claim 9, integrated into a mobile phone, a set top box, a music player, a video player, an entertainment unit, a navigation device, a computer, a hand-held personal communication systems (PCS) unit, a portable data unit, and/or a fixed location data unit.

17. A cache controller for wear-leveling of an on-chip, non-volatile cache memory, comprising:

means for dynamically rotating cache sets of the on-chip, non-volatile cache memory by performing a plurality of memory location swap operations on the cache sets when a number of memory write operations to the cache memory reaches a threshold value, each swap operation including invalidating contents from cache sets being swapped and leaving memory contents of other cache sets intact by swapping a mapping of at least two of the cache sets being swapped at a time without moving contents of the at least two of the cache sets being swapped between the cache sets, and shifting the cache sets by at least one step after a complete swap rotation; and means for tracking the swapped cache sets to convert a logical cache set number to a physical cache set number.

18. The cache controller of claim 17, integrated into a mobile phone, a set top box, a music player, a video player, an entertainment unit, a navigation device, a computer, a hand-held personal communication systems (PCS) unit, a portable data unit, and/or a fixed location data unit.

19. A method for wear-leveling of an on-chip, non-volatile cache memory, comprising:

the step of dynamically rotating cache sets of the on-chip, non-volatile cache memory by performing a plurality of memory location swap operations on the cache sets when a number of memory write operations to the cache memory reaches a threshold value, each swap operation including invalidating contents from cache sets being swapped and leaving memory contents of other cache sets intact by swapping a mapping of at least two of the cache sets being swapped at a time without moving contents of the at least two of the cache sets being swapped between the cache sets and shifting the cache sets by at least one step after a complete swap rotation; and the step of tracking the swapped cache sets to convert a logical cache set number to a physical cache set number.

20. The method of claim 19, further comprising integrating the cache memory into a mobile phone, a set top box, a music player, a video player, an entertainment unit, a navigation device, a computer, a hand-held personal communication systems (PCS) unit, a portable data unit, and/or a fixed location data unit.

* * * * *